United States Patent [19]

Siegenthaler

[11] Patent Number: 5,304,270
[45] Date of Patent: Apr. 19, 1994

[54] TIRE MANUFACTURING PROCESS

[75] Inventor: Karl J. Siegenthaler, Rome, Italy

[73] Assignee: Bridgestone Corporation, Tokyo, Japan

[21] Appl. No.: 966,977

[22] Filed: Oct. 27, 1992

[30] Foreign Application Priority Data

Oct. 31, 1991 [IT] Italy ........................ TO91A 000820

[51] Int. Cl.⁵ ............................................. B29D 30/20
[52] U.S. Cl. .................................. 156/127; 156/129;
156/130.5; 156/130.7; 264/326; 264/501;
425/58.1
[58] Field of Search ............... 156/111, 129, 126, 127,
156/128.1, 130.7, 110.1, 396, 406.2, 414, 415,
394.1; 264/501, 502, 326; 425/36, 46, 47, 58,
58.1, 28.1

[56] References Cited

U.S. PATENT DOCUMENTS

| | | | |
|---|---|---|---|
| 1,615,473 | 1/1927 | Midgley . | |
| 2,978,741 | 4/1961 | Soderquist | 425/58.1 |
| 3,135,997 | 6/1964 | Smyser | 18/18 |
| 3,276,930 | 10/1966 | Keefe, Jr. | 264/326 X |
| 3,347,964 | 10/1967 | Sidles | 264/94 |
| 4,743,322 | 5/1988 | Holroyd et al. | 264/501 X |

FOREIGN PATENT DOCUMENTS

| | | | |
|---|---|---|---|
| 253778 | 9/1963 | Australia | 156/127 |
| 9200846 | 1/1992 | European Pat. Off. . | |
| 1030738 | 5/1966 | United Kingdom | 156/126 |
| 2133357 | 7/1984 | United Kingdom . | |

*Primary Examiner*—Geoffrey L. Knable
*Attorney, Agent, or Firm*—David A. Thomas

[57] ABSTRACT

A process for manufacturing road vehicle tires (2), whereby each bead portion (4) of a first stage carcass (1) of a green tire (2) is fitted to a respective circular inner annular support (22), and a finished green tire (2) is formed by fitting the first stage carcass (1) to a second stage outer annular tread assembly (11) inside a toroidal housing constituting a tire forming mold (52), the inner annular periphery of which is defined by the inner annular supports (22) of the bead portions (4) of the first stage carcass (1), and the inner surface of which negatively reproduces the outer surface of the finished tire (2). The annular supports (22) of the bead portions (4) are maintained connected to the tire (2) pending completion of the post-inflation stage.

7 Claims, 5 Drawing Sheets

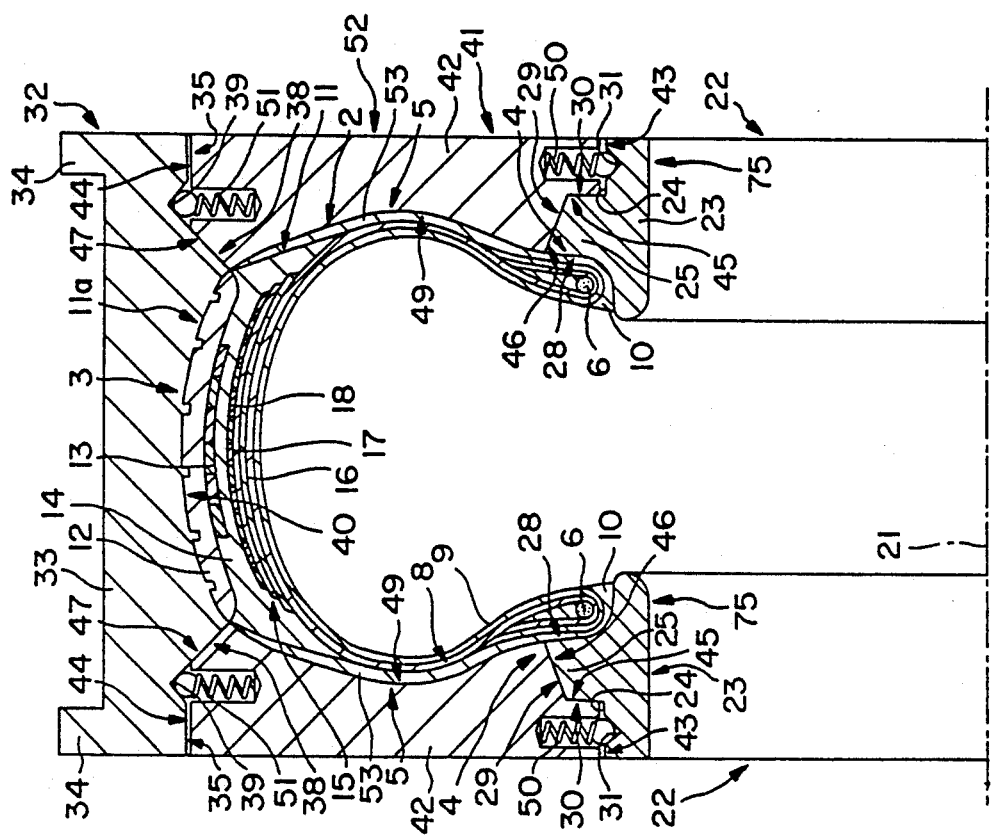
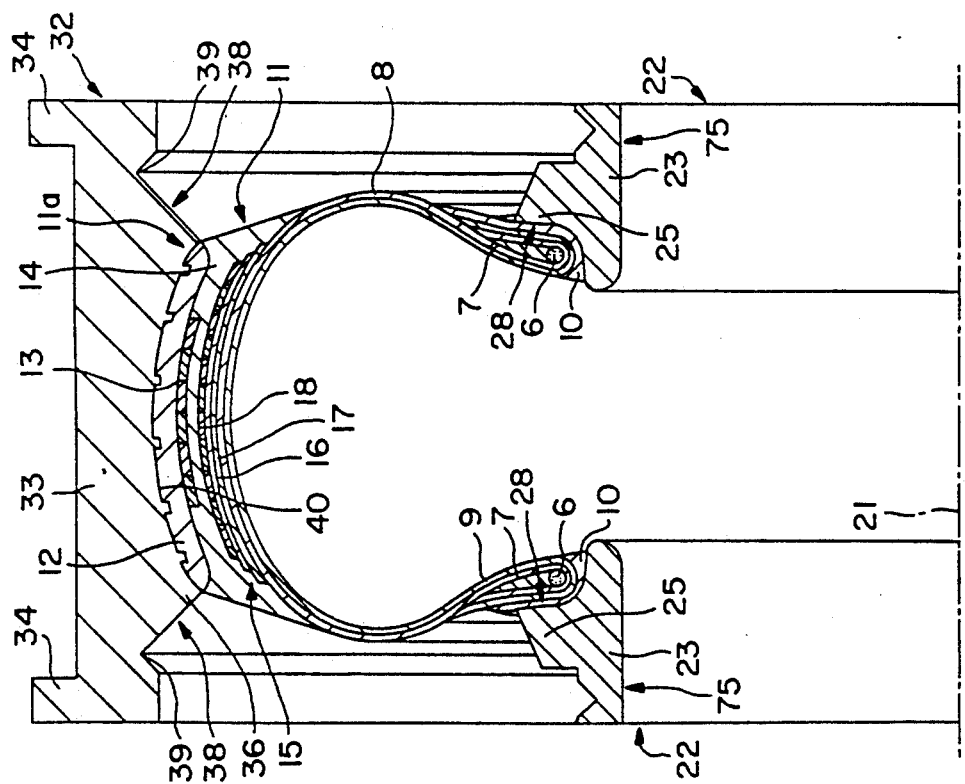

TIRE MANUFACTURING PROCESS

BACKGROUND OF THE INVENTION

1. Technical Field

The present invention relates to a process for manufacturing road vehicle tires.

2. Background Information

Road vehicle tires are normally produced by assembling a first stage carcass and second stage outer annular tread assembly together to form a green tire, which is normally stitched externally, after being inflated with compressed air to ensure adhesion of the first and second stages. The green tire is then cured in a curing mold and restored to ambient temperature by means of a final post-inflation process.

The above method, which is currently employed by the majority of manufacturers, clearly provides in no way for in-process control of the external shape of the green tire. The absence of such control is responsible for most of the major defects encountered in finished tires currently available on the market, such as axial and radial dissymmetry, which are mainly caused by no control being effected for the position of the bead portions in relation to the outer tread portion.

Defects of this sort remain even after curing, despite forming the tire at relatively high temperatures against the surface of a mold negatively reproducing the outer surface of the finished tire. Each finished tire, retains not only any existing structural defects, but also stresses deriving from the shape memory of the tire components, which distort the tire slightly subsequent to removal from the curing mold and post-inflation.

SUMMARY OF THE INVENTION

It is an object of the present invention to provide a tire manufacturing process enabling constant control of the shape of the tire throughout substantially the entire process.

According to the present invention, there is provided a process for manufacturing road vehicle tires comprising a first stage carcass having two bead portions; and a second stage outer annular tread assembly; comprising fitting each bead portion of the first stage carcass to a respective inner circular annular support; producing a finished green tire by fitting the first stage carcass to a respective said outer annular tread assembly located inside an outer annular body constituting a first portion of an annular tire forming mold, said inner annular supports constituting a second portion of said forming mold; and maintaining said annular supports connected to said respective bead portions until the tire has been post-inflated.

The above process preferably comprises a further stage wherein the two inner annular supports are locked in relation to said outer annular body and in relation to each other by first clamping means located between each inner annular support and the outer annular body, so as to define a toroidal housing forming at least part of said annular tire forming mold, the inner annular periphery of which is defined by said annular supports, and the inner surface of which negatively reproduces the outer surface of the finished tire.

According to a preferred embodiment of the above process, said first clamping means comprises two annular plates, each located between the outer annular body and a respective inner annular support, so as to define a lateral wall of said toroidal housing; each annular wall being fitted in removable manner to the outer annular body and a respective one of said inner annular support. The process preferably comprising a further stage wherein said carcass is fitted with sidewall portions by means of said annular plates, when these are fitted to the outer annular body and inner annular supports.

The above process preferably comprises further stages consisting in detaching said inner annular supports from said first clamping means after curing; and maintaining the inner annular supports in a fixed position in relation to each other via second clamping means, preferably fitted through the inner annular supports.

BRIEF DESCRIPTION OF THE DRAWINGS

A non-limiting embodiment of the present invention will be described by way of example with reference to the accompanying drawings, in which:

FIG. 2 shows a schematic axial half section of the final stage in the assembly of the first stage carcass to the annular tread assembly;

FIG. 3 shows a schematic axial half section of the finishing stage in the formation of a green tire according to the present invention;

BEST MODE FOR CARRYING OUT THE INVENTION

Figure 1:
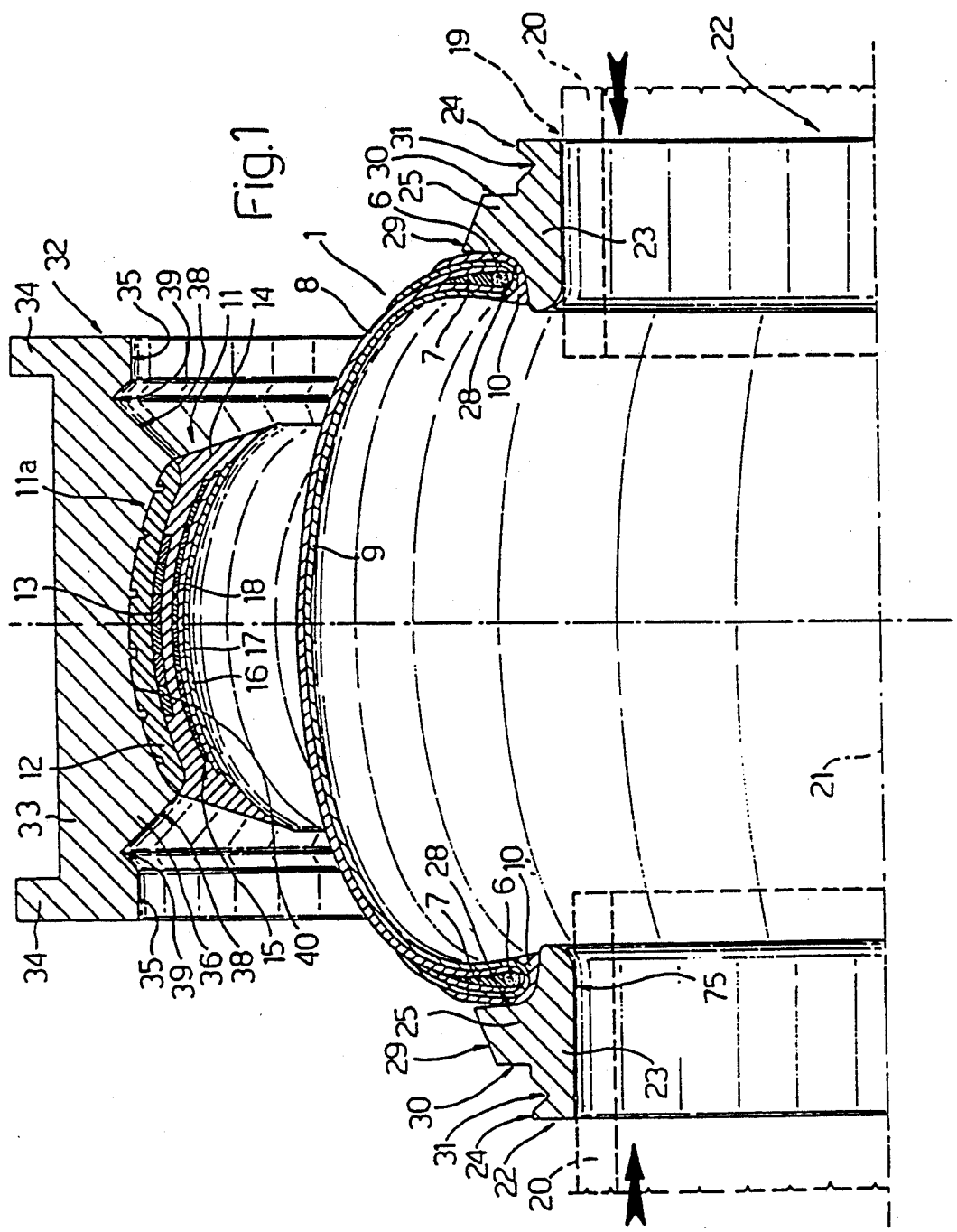
FIG. 1 shows a schematic axial half section of a first stage carcass mounted on inner annular supports according to the present invention, and being formed inside an annular tread assembly.

Number 1 in FIG. 1 indicates a first stage carcass of a tire 2 comprising, as shown in FIG. 3, a central tread portion 3; two bead portions 4; and two lateral portions 5 connecting a respective bead portion 4 to a respective lateral end of tread portion 3. Inside tire 2, carcass 1 comprises two metal beads 6, each having a substantially triangular-section filler 7 located on a respective bead portion 4. Carcass 1 also comprises a reinforced body ply 8 surrounding beads 6; an innerliner 9 on the inner surface portion of body ply 8 between beads 6; and two abrasion strips 10, each covering a respective portion of body ply 8 about respective bead 6.

As shown particularly in FIG. 1, in addition to carcass 1, tire 2 also comprises a second stage assembly 11. In the example shown, assembly 11 has an annular tread cap 12 having a tread base 13 and a cushion 14 which defines an annular tread 11a, the substantially barrel-shaped inner surface of which presents a circumferential groove, housing a reinforced tread belt 15. In the example shown, tread belt 15 is defined by two tread plies 16 and 17, the first outside the second, and both covered externally by a helper ply 18 consisting of a spirally wound strip of elastomeric material.

As shown in FIG. 1, carcass 1 is formed into substantially the finished shape, i.e. a substantially U-shaped axial half-section with its concavity facing inwards, on a supporting device 19. Device 19 comprises two slides 20 aligned along axis 21 of carcass 1 and moved in opposite directions, by known actuating members (not shown), to and from a forward operating position (not shown).

Each slide 20 is fitted with an annular element coaxial with axis 21 constituting an inner annular support 22 for a respective bead portion 4. When slides 20 are in the forward operating position, annular supports 22 are positioned as shown in FIGS. 2 and 3. Each annular support 22 comprises an annular plate 23, the outer cylindrical surface 24 of which, on the side facing the other annular support 22, presents a substantially triangular-section annular rib 25. Rib 25 is defined on the side facing the other annular support 22, by a concave annular surface 28 shaped as to mate with a respective abrasion strip 10. On the outward side, each annular rib 25 is defined by a truncated cone-shaped surface 29 tapering outwards and connected to surface 24 by an annular shoulder 30. Annular surface 24 also presents an annular groove 31 outwards of annular shoulder 30.

As shown in FIG. 1, second stage assembly 11 is formed in an outer annular body 32 defined by a cylindrical ring 33 having two outer annular end ribs 34, and defined internally by a cylindrical surface 35. From a central portion of cylindrical surface 35, there projects radially inwards an annular rib 36, the axial ends of which are defined by respective truncated cone-shaped surfaces 38 tapering inwards with substantially the same taper as surfaces 29. Surface 35 presents two circumferential grooves 39, each located outwards of respective surface 38, and substantially similar to grooves 31. Rib 36 is defined internally by a substantially barrel-shaped annular surface 40 negatively reproducing the pattern of tread cap 12.

Second stage assembly 11 is formed inside annular body 32 using the method described in co-pending U.S. patent applications Ser. Nos. 07/966,986, filed Oct. 27, 1992, and 07/967,358, filed Oct. 27, 1992 to which full reference is made herein in the interest of full disclosure.

As deducible from FIGS. 1 and 2, outer annular body 32, with second stage assembly 11 inside, is transferred in a known manner (not shown) into a position coaxial with axis 21, at which point, it is moved axially along axis 21 onto the outside of carcass 1 (FIG. 2), which is supported on slides 20 in the semi-formed position (FIG. 1), i.e. with slides 20 further apart than in the forward operating position. Subsequent displacement of slides 20 into the forward operating position (not shown) completes the formation of carcass 1 (FIG. 2) which adheres to the inner surface of belt 15.

In connection with the above, it should be pointed out that, according to obvious variations not shown, instead of being placed inside outer annular body 32, one or more inner components of second stage assembly 11 may be applied directly onto the outer surface of carcass 1 prior to inserting it inside outer annular body 32.

As shown in FIG. 2, to complete the formation of carcass 1, each annular support 22 is moved into a position wherein groove 31 substantially faces corresponding groove 39 in ring 33, and truncated cone-shaped surface 29 faces corresponding truncated cone-shaped surface 38, which is tapered oppositely as compared with facing surface 29.

As shown in FIG. 3, annular supports 22 are clamped in relation to each other in the forward operating position, as well as in a perfectly coaxial, axially-fixed position in relation to outer annular body 32, by a clamping device 41. Device 41 comprises two annular plates 42 coaxial with axis 21 and facing each other on opposite sides of outer annular body 32.

Each plate 42 presents a cylindrical inner surface 43 and a cylindrical outer surface 44 positionably facing and substantially contacting, cylindrical surface 24 of respective annular support 22 and inner surface 35 of ring 33, respectively. On the side facing the other plate 42, each plate 42 is defined by an annular shoulder 45 adjacent to surface 43 and positionably facing an substantially contacting annular shoulder 30 of respective annular support 22. Each plate 42 further includes a first truncated cone-shaped surface 46 adjacent to shoulder 45 and positionably contacting truncated cone-shaped surface 29 of respective annular support 22, a second truncated cone-shaped surface 47 adjacent to surface 44 and positionably contacting respective truncated cone-shaped surface 38, and a concave annular surface 49 connecting surfaces 46 and 47.

Each plate 42 presents a first number of spherical locking devices 50 evenly spaced along surface 43 and engaging groove 31 of respective annular support 22; and has a second number of spherical locking devices 51 evenly spaced along surface 44 and engaging respective groove 39. When engaged inside respective grooves 31 and 39, devices 50 and 51 lock respective plates 42 in an operating assembly position wherein surfaces 49 connect surfaces 28 and 40 in such a manner as to define the inner surface of a toroidal, annular forming mold 52. An inner portion of mold 52 is formed by annular supports 22, an outer portion of which is formed by annular body 32, and the inner surface of which, defined by surfaces 28, 49 and 40, negatively reproduces the outer surface of finished tire 2.

As shown in FIG. 3, in addition to forming a portion of clamping device 41, each plate 42 also forms a device for supporting and supplying an annular sidewall 53 of tire 2, located outwards of body ply 8, between respective abrasion strip 10 and a respective lateral edge of tread 11a.

Once completed, forming mold 52 is fitted centrally to a curing unit (not shown), as described and illustrated in a co-pending U.S. patent application Ser. No. 07/967,345, filed Oct. 27, 1992, to which full reference is made herein in the interest of full disclosure, to form a curing mold (not shown). This curing mold is then transferred to a curing station (not shown) as described in a co-pending U.S. patent application Ser. No. 07/967,001, filed Oct. 27, 1992, to which full reference is also made herein in the interest of full disclosure. After curing, forming mold 52 is detached from the curing unit and, as shown in FIG. 4, is mounted with outer ribs 34 engaged inside respective rails 54, on which it is rolled to a station 55 where finished tire 2 is removed.

Figure 4:
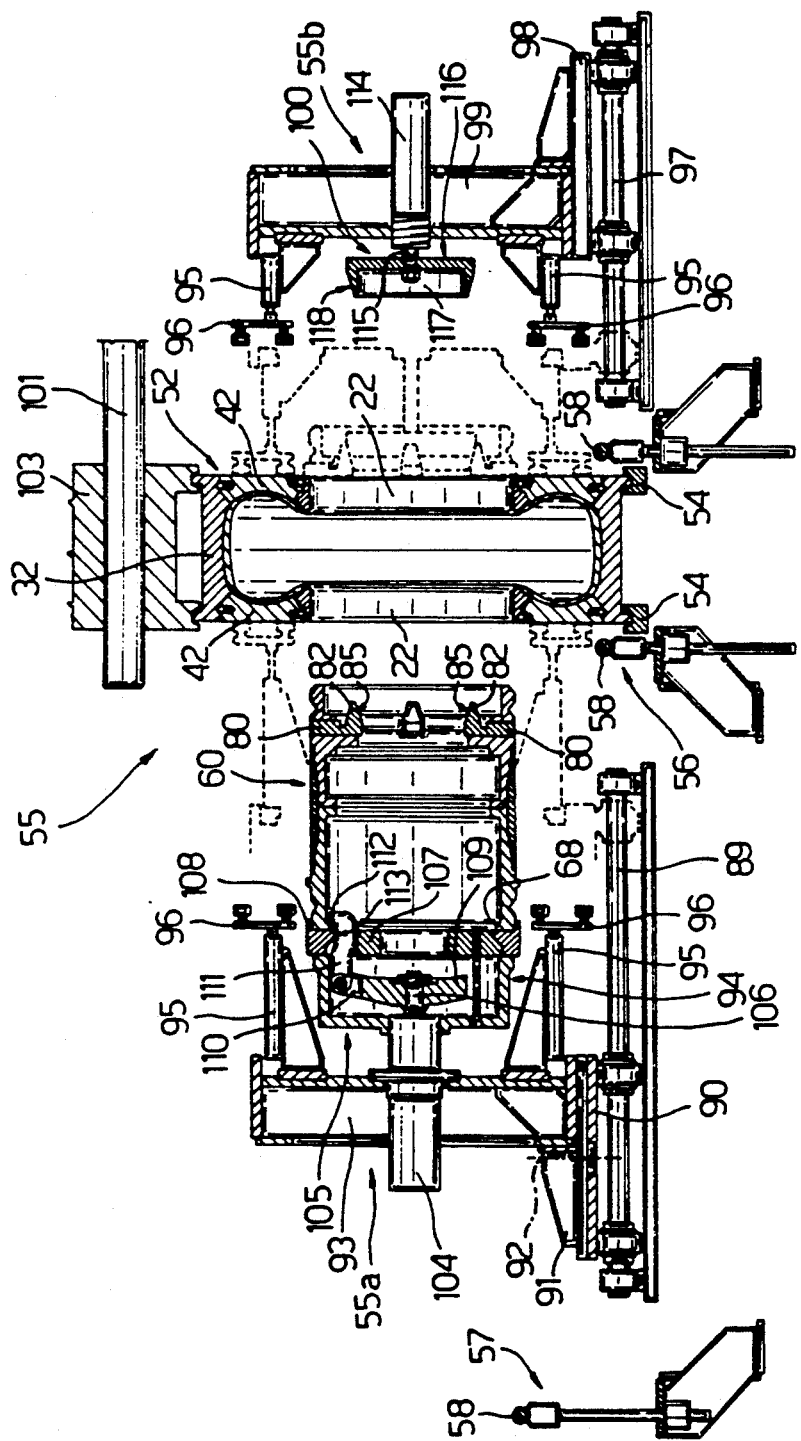
FIGS. 4 and 5 show schematic cross sections of two final stages in the process according to the present invention.
Figure 5:
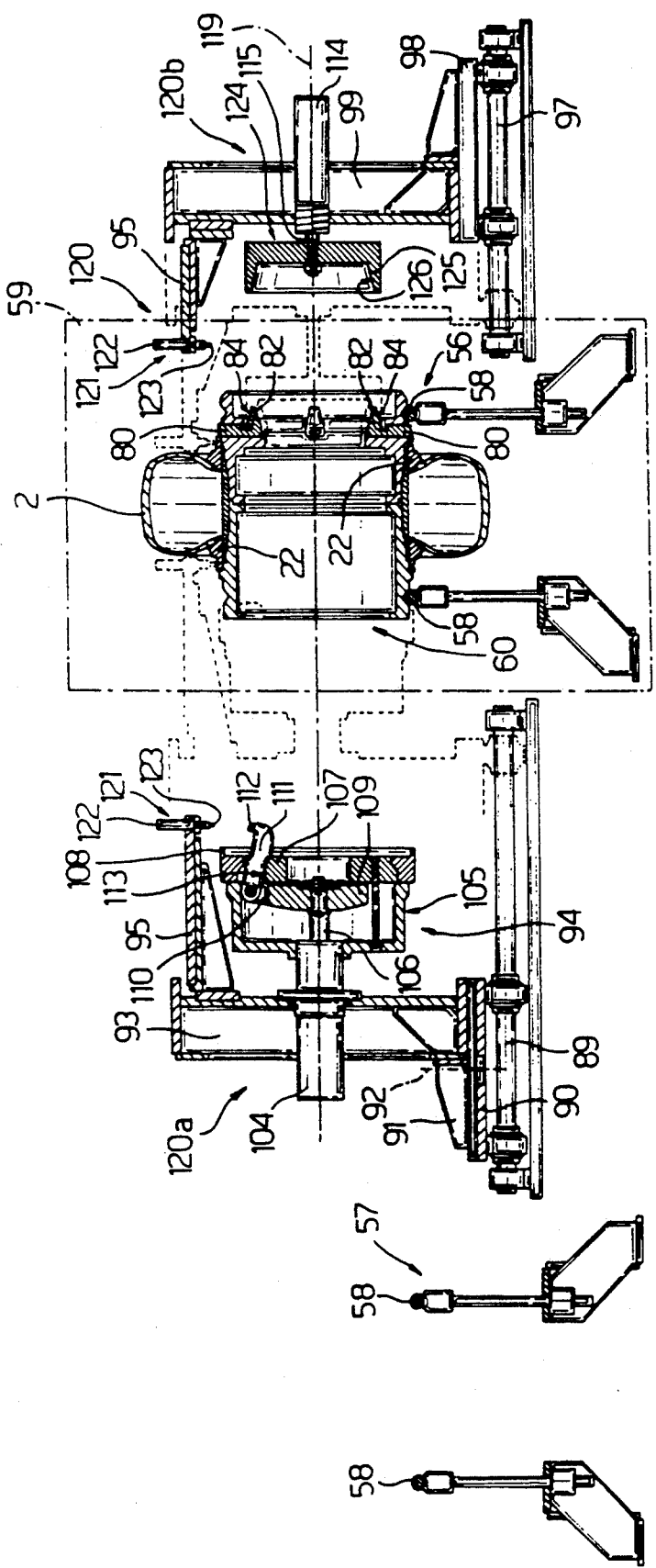

As shown in FIG. 4, station 55 is crossed by rails 54, and by the outward and return branches 56 and 57 of two rails 58 extending through a known post-inflation tunnel 59 (FIG. 5) downstream from station 55 in the traveling direction along rails 58. Annular supports 22 are engaged and locked in relation to each other, and in engagement with respective bead portions 4, even after tire 2 is removed from forming mold 52 by an auxiliary support 60.

Figure 6:
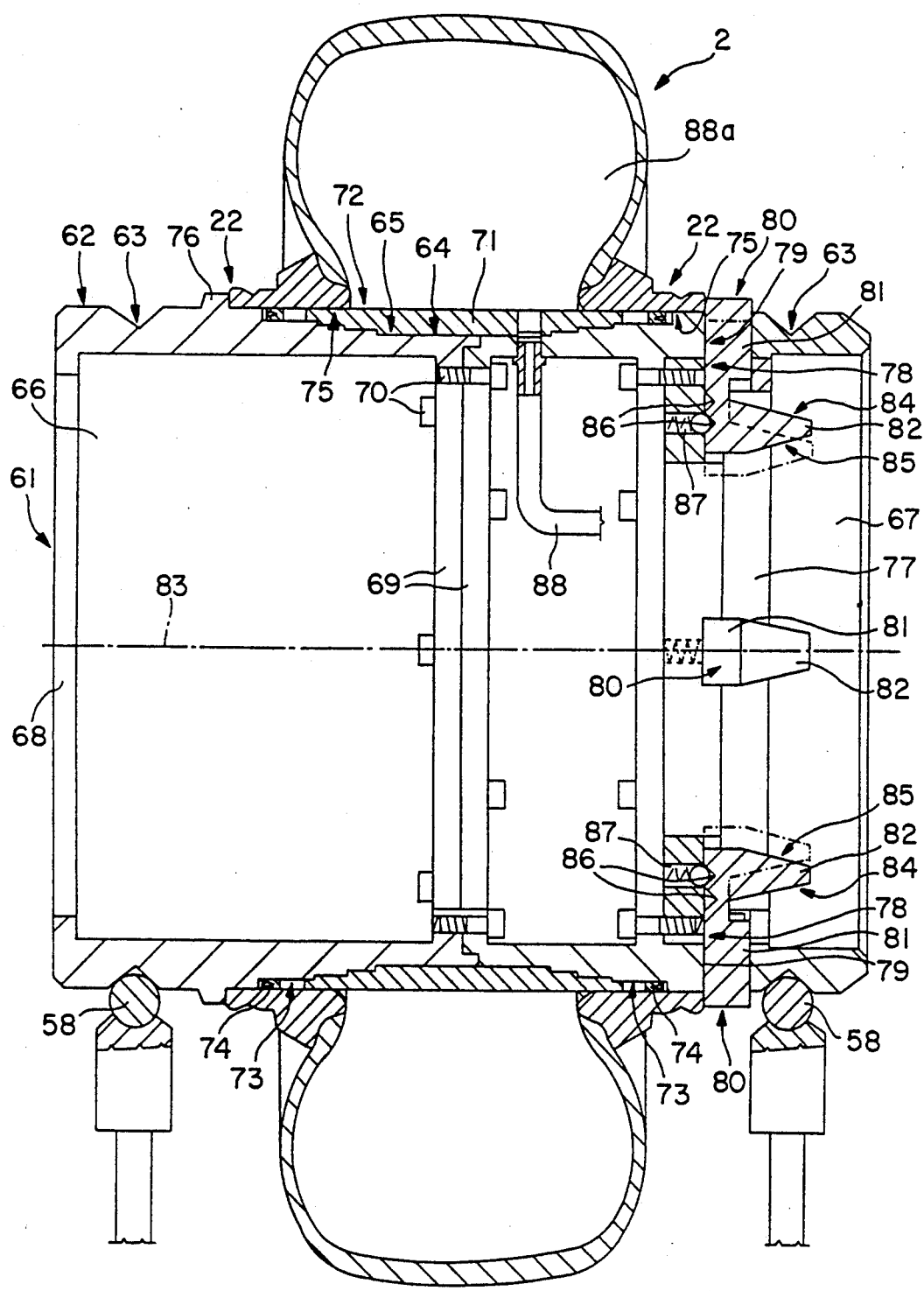
FIG. 6 shows a larger-scale axial section of a detail in FIGS. 4 and 5.

As shown in FIG. 6, auxiliary support 60 comprises a drum 61 having a substantially cylindrical outer surface 62 in which are formed two annular end grooves 63 engaged by respective rails 58 along which drum 61 is rolled through post-inflation tunnel 59. Surface 62 also presents a central annular recess 64 having a sunken central annular portion 65 along the center line of which drum 61 is divided transversely into two half drums 66 and 67. On the opposite end to that facing half drum 67, half drum 66 presents a first inner flange 68, and on the other end, a second inner flange 69 connected by screws 70 to a corresponding inner flange 69 on half drum 67. Sunken annular portion 65 is engaged by the mid portion of a ring 71 coaxial with drum 61 and defined by an outer surface 72 having the same diameter as surface 62 and defining two annular grooves 73 with the surface 62 portions on either side of annular recess 64. Each groove 73 is engaged by an annular seal 74 cooperating in fluidtight manner with the inner cylindrical surface 75 of respective annular support 22, the inside diameter of which is approximately equal to, but no smaller than, the diameter of surface 62.

From the portion of outer surface 62 defined by half drum 66, there extends radially outwardly, an annular rib 76, outwardly adjacent to respective seal 74. Half drum 67 is fitted inside with an annular body 77 through which are formed radial openings 78, each aligned with a corresponding radial opening 79 formed through half drum 67. Each pair of radial openings 78 and 79 is engaged in a sliding manner by a substantially L-shaped latch 80. Latch 80 comprises a rod 81 arranged radially in relation to half drum 67 and fitted in a sliding manner through respective openings 78 and 79. An appendix 82 of latch 80 projects outwards from the inner end of rod 81 and parallel to axis 83 of drum 61. Appendix 82 is substantially wedge-shaped, and defined laterally by two surfaces 84 and 85 sloping in relation to each other and to axis 83.

Each rod 81 presents two lateral recesses 86 selectively engaged by a spherical locking device 87, for selectively locking rod 81 in a withdrawn idle position. In this idle position, the end of rod 81 opposite that fitted with appendix 82, is located inside surface 62, and an extracted operating position, wherein rod 81 projects outwards of surface 62. In the operating position, rods 81 define with annular rib 76, a chamber equal in length to the axial dimension of forming mold 52 at annular supports 22. A conduit 88 supplies compressed air inside a toroidal bladder 88a which is defined inside of tire 2 on auxiliary support 60, by ring 71, seals 74 and inner supports 22.

With reference to FIG. 4, rails 54 are located between rails 58 of branch 56 and between branches 56 and 57 at removal station 55. Provision is made for an operating unit 55a comprising a slideway 89 perpendicular to rails 58 on which is supported a powered slide 90 fitted with a platform 91 which rotates in relation to slide 90, about a vertical axis perpendicular to rails 54 and 58. Platform 91 supports an upright 93 fitted with a device 94, for clamping and supporting auxiliary support 60, and with a number of telescopic arms 95. Each arm 95 is fitted on its free end with a known gripping member 96, preferably consisting of a magnetic member designed to mate with a respective annular plate 42 for detaching it from respective inner annular support 22 and outer annular body 32.

Station 55 also comprises a further operating unit 55b comprising a slideway 97 coaxial with slideway 89 and adjacent to rails 54 on the opposite side of rails 54 and branch 56 of rails 58 as compared with slideway 89. Slideway 97 supports a powered slide 98, in turn supporting an upright 99 parallel to upright 93. Upright 99 is fitted with a device 100 for moving latches 80 from the withdrawn idle position to the extracted operating position, and has a second telescopic arm 95, the free end of which presents a gripping member 96 designed to mate with a respective annular plate 42 for detaching it from respective inner annular support 22 and outer annular body 32.

Station 55 also comprises a cross member 101 extending over rails 54 and fitted with a grip 103 for axially and transversely locking outer annular body 32 on rails 54 inside station 55.

Device 94 comprises a substantially horizontal actuator 104 connected integral with upright 93 and supporting, at its output end, a bell 105 fitted through and coaxially with output rod 106 of actuator 104. Bell 105 is arranged with its convex side facing upright 93, and is closed by a transverse wall 107. An annular front rib 108 projects axially outwards from the edge of wall 107, the inside diameter of which is approximately equal to but no smaller than the diameter of surface 62. Inside bell 105, rod 106 is fitted with a disk 109, from the edge of which project a number of forks 110 (only one of which is shown), each supporting a hinged lever 111 having a tooth 112 on its free end. Each lever 111 engages in a sliding manner a respective inclined cam hole 113 formed through wall 107 and designed so that axial displacement of rod 106 rotates lever 111 between a lowered idle position, wherein tooth 112 is positioned inside the inner edge of flange 68 of an auxiliary support 60 coaxial with rod 106 in station 55, and a raised operating position, wherein tooth 112 is positioned so as to interfere with flange 68 of said auxiliary support.

Device 100 comprises a substantially horizontal actuator 114 connected integral with upright 99 and has an output rod 115 perpendicular to rails 54 and 58, and is fitted on its free end with a bell 116 arranged with its concave side facing upright 93. Bell 116 comprises an annular lateral wall 117 defined externally by a truncated cone-shaped surface 118 coaxial with axis 119 of rod 115 and designed to contact surfaces 84 of appendixes 82 of rods 81, so as to gradually move respective latches 80 from the withdrawn idle position into the extracted locked operating position.

In actual use, on leaving the curing station (not shown) and being detached from the curing unit (not shown), forming mold 52 is rolled along rails 54 to station 55, where it is arrested coaxial with axis 119 by a stop device (not shown).

Before forming mold 52 is arrested, station 55 receives, along return branch 57 of rails 58, an auxiliary support 60, which is arrested coaxial with axis 119, with half drum 66 facing upright 93. Platform 91 is then rotated to position bell 105 coaxial with axis 119 facing auxiliary support 60 on return branch 57. Slide 90 is activated to bring wall 107 into contact with the outer end of half drum 66, rib 108 into engagement with surface 62, and idle levers 111 into half drum 66, with teeth 112 beyond flange 68. Actuator 104 is then operated to withdraw levers 111 which are guided by respective holes 113, and which rotate outwards so as to engage flange 68 via teeth 112 and press drum 61 onto wall 107 inside rib 108.

With auxiliary support 60 thus connected integrally with bell 105, platform 91 is rotated 180° to position auxiliary support 60 facing and coaxial with forming mold 52 resting coaxially with axis 119 on rails 54, and locked in this position by grip 103 engaging outer annular body 32.

Slides 90 and 98 are then activated to insert auxiliary support 60 inside inner annular supports 22 of mold 52, so that the annular support 22 facing upright 93 contacts rib 66. At the same time, gripping members 96 mate with respective annular plates 42, which are detached from outer annular body 32 and respective annular supports 22 by activating respective telescopic arms 95. At the same time, bell 116 moves forward to set latches 80 into the extracted operating position axially locking annular supports 22 and tire 2 onto auxiliary support 60. Thus, when slide 90 moves back and annular body 32 is locked in position on rails 54 by grip 103, support 60 is removed from annular body 32, together with annular supports 22 and tire 2, and unloaded onto outward branch 56 of rails 58, once annular body 32 is removed.

At this point, withdrawal of rod 106 of actuator 104 and simultaneous further displacement of slide 90, detach auxiliary support 60 from bell 105, after which, auxiliary support 60 is rolled along outward branch 56 of rails 58 to post-inflation tunnel 59.

In connection with the above, it should be pointed out that, upon removal from outer annular body 32, tire 2 is inflated with air supplied along conduit 88, so as to achieve the exact final shape prior to post-inflation, and lock inner annular supports 22 against annular rib 76, on one side, and latches 80 on the other. In other words, auxiliary support 60 acts not only as a carriage for feeding tire 2 through post-inflation tunnel 59, but also, and more importantly, acts as a clamping device for maintaining annular supports 22 positioned perfectly in relation to each other pending completion of the post-inflation stage.

On leaving post-inflation tunnel 59, auxiliary support 60 is arrested coaxial with axis 119 of an unloading station 120 crossed by branches 56 and 57 of rails 58. Station 120 comprises two operating units 120a and 120b located on opposite sides of outward branch 56, with unit 120a between branches 56 and 57.

Unit 120a is substantially identical to unit 55a, the only difference being that each of the telescopic arms 95 presents a gripping device 121 for a respective inner annular support 22. In particular, each device 121 comprises an actuator 122 positioned radially in relation to axis 119, having an output member consisting of a push rod 123 designed to radially engage groove 31 of respective inner annular support 22.

On unit 120b, which is substantially identical to unit 55b, telescopic arms 95 also present respective gripping devices 121, while device 100 presents a bell 124, the lateral wall 125 of which is defined internally by a truncated cone-shaped surface 126 designed to gradually contact outer surface 84 of appendixes 82, so as to move latches 80 into the withdrawn idle position.

When an auxiliary support 60 is arrested coaxial with axis 119, units 120a and 120b are brought together to clamp and support auxiliary support 60 by means of device 94, and radially engage inner annular supports 22 by means of devices 121 and move latches 80 into the withdrawn idle position by means of bell 124. At this point, outward branch 56 of rails 58 is detached from drum 61, and unit 120b is withdrawn from unit 120, so as to remove annular support 22 from bead portion 4 and drum 61. This leaves tire 2 resting, on one side, on the other annular support 22, and on the other, on surface 62. Finally, telescopic arms 95 of unit 120a are activated to move the other annular support 22 towards latches 80, which removes annular support 22 from drum 61 and unloads finished tire 2.

When removed from drum 61, annular supports 22 are picked up by overhead conveyors (not shown) and returned to the carcass assembly station (not shown), while auxiliary support 60 is unloaded by unit 120a onto return branch 57 of rails 58 and rolled back to removal station 55.

From the foregoing description and the operational discussion, when read in light of the several drawings, it is believed that those familiar with the art will readily recognize and appreciate the novel concepts and features of the present invention. Obviously, while the invention has been described in relation to only a limited number of embodiments, numerous variations, changes, substitutions and equivalents will present themselves to persons skilled in the art and may be made without necessarily departing from the scope and principles of this invention. As a result, the embodiments described herein are subject to various modifications, changes and the like without departing from the spirit and scope of the invention with the latter being determined solely by reference to the claims appended hereto.

I claim:

1. A process for manufacturing road vehicle tires comprising a first stage carcass having two bead portions, and a second state outer annular tread assembly; comprising the steps of fitting each bead portion of the first stage carcass to a respective inner circular annular support; producing a finished green tire by fitting the first stage carcass to a respective said outer annular tread assembly located inside an outer annular body constituting a first portion of an annular tire forming mold, said inner annular supports constituting a second portion of said forming mold; locking said two inner annular supports in relation to said outer annular body and in relation to each other, via first clamping means located between inner annular support and the outer annular body; curing said green tire in said forming mold; and maintaining said annular supports connected to said respective bead portions; post-inflating said cured tire while said annular supports are connected to respective bead portions; and disconnecting said annular supports from respective bead portions after post-inflation.

2. A process as claimed in claim 1 wherein the first clamping means together with each inner annular support and the outer annular body define a toroidal housing at least partially constituting said annular tire forming mold, the inner surface of which negatively reproduces the outer surface of said finished tire.

3. A process as claimed in claim 2 in which the first clamping means comprises two annular plates, each located between the outer annular body and a respective inner annular support, so as to define a lateral wall of said toroidal housing; each annular plate being connected in a removable manner to the outer annular body and to said respective inner annular support.

4. A process as claimed in claim 3 comprising the further step of fitting said carcass with sidewall portions by means of said annular plates, when said annular plates are fitted to said outer annular body and to said inner annular supports.

5. A process as claimed in claim 2 comprising the further step of detaching said inner annular supports from said first clamping means after curing; and maintaining said inner annular supports connected to said tire and in a fixed position in relation to each other and in relation to said second state outer annular tread assembly, and which position is the same as that during curing, via second clamping means for enabling post-inflation of said tire.

6. A process as claimed in claim 5 in which said second clamping means are fitted through said inner annular supports, and are connected to said inner annular supports so as to define, with said tire, a fluidtight toroidal bladder.

7. A process as claimed in claim 6 wherein the step of post-inflating comprises feeding compressed air into said toroidal bladder during the period in which said inner annular supports are connected to said second clamping means.

* * * * *